(12) United States Patent
Endo et al.

(10) Patent No.: US 9,076,599 B2
(45) Date of Patent: Jul. 7, 2015

(54) LAMINATED CERAMIC ELECTRONIC PARTS

(71) Applicant: TDK CORPORATION, Tokyo (JP)

(72) Inventors: Makoto Endo, Tokyo (JP); Hirobumi Tanaka, Tokyo (JP); Osamu Kido, Tokyo (JP)

(73) Assignee: TDK Corporation, Tokyo (JP)

(*) Notice: Subject to any disclaimer, the term of this patent is extended or adjusted under 35 U.S.C. 154(b) by 185 days.

(21) Appl. No.: 13/650,571

(22) Filed: Oct. 12, 2012

(65) Prior Publication Data

US 2013/0094121 A1    Apr. 18, 2013

(30) Foreign Application Priority Data

Oct. 14, 2011   (JP) .................................. 2011-226508
Jul. 12, 2012   (JP) .................................. 2012-156363

(51) Int. Cl.
*H01G 4/30*   (2006.01)
*H01G 4/12*   (2006.01)
*H01G 4/008*  (2006.01)

(52) U.S. Cl.
CPC .............. *H01G 4/30* (2013.01); *H01G 4/1227* (2013.01); *H01G 4/12* (2013.01); *H01G 4/0085* (2013.01); *H01G 4/1209* (2013.01)

(58) Field of Classification Search
CPC ......... H01G 4/30; H01G 4/12; H01G 4/1227; H01G 4/008; H01G 4/1209; H01G 4/1218; H01G 4/1245; H01G 4/10
USPC ..................................... 361/301.4, 321, 321.2
See application file for complete search history.

(56) References Cited

U.S. PATENT DOCUMENTS

2008/0304204 A1    12/2008   Suzuki
2009/0128990 A1*   5/2009    Inoue et al. ................. 361/321.4

FOREIGN PATENT DOCUMENTS

| JP | 06-151234 | * 5/1994 | ............... H01G 4/12 |
|---|---|---|---|
| JP | A-08-055756 | 2/1996 | |
| JP | B2-2857552 | 2/1999 | |
| JP | A-2000-331867 | 11/2000 | |
| JP | B2-3531543 | 5/2004 | |
| JP | B2-4293615 | 7/2009 | |
| JP | A-2010-103566 | 5/2010 | |
| JP | A-2011-29533 | 2/2011 | |

OTHER PUBLICATIONS

English-language translation of Dec. 12, 2013 Office Action issued in South Korean Patent Application No. 10-2012-0111905.

* cited by examiner

*Primary Examiner* — Dion R Ferguson

(74) *Attorney, Agent, or Firm* — Oliff PLC

(57) ABSTRACT

A compact laminated ceramic electronic component having superior moisture resistance and electrical properties is provided.

A laminated ceramic electronic component 1 includes an inner layer portion that contains a plurality of dielectric layers 2a and internal electrode layers 3 comprising Ni as a main component that are laminated alternately, and a pair of dielectric outer layer portions 2b which sandwich the inner layer portions. And Ni particles are segregated in the dielectric outer layer portions 2b.

And the amount of Ni particles existing in the dielectric layers 2a is smaller than that in the dielectric outer layer portions 2b.

1 Claim, 3 Drawing Sheets

LAMINATED CERAMIC ELECTRONIC PARTS

The present invention relates to a laminated ceramic electronic component and, particularly, to a laminated ceramic electronic component that is small and compact and has good reliability.

BACKGROUND

Recently, as electronic circuits have become highly densified, there are increasing demands to make electronic components that are more compact and have higher performance capabilities. Hence, for example, more compact and larger capacity laminated ceramic capacitors are in high demand.

A laminated ceramic capacitor is embedded with a plurality of opposite internal electrode layers through a dielectric ceramic layer of small thickness inside the ceramic element body. Both sides of the thickness direction of the ceramic element body are covered with outer layer portions, the thickness of which is sufficiently thicker than that of the dielectric ceramic layer (dielectric layer) between the internal electrode layers, and both sides of the longitudinal direction of the ceramic element body are attached with terminal electrodes which are conducted to the internal electrode layers.

For a laminated ceramic capacitor to achieve a small size and a large capacity, methods for increasing the dielectric constant of the dielectric layer, and methods for making the dielectric layer or internal electrode layer and the outer layer portion thinner, have been considered.

However, if the outer layer portion is thinned, there may be problems that when the capacitor is subjected to plating treatment in the process of forming external electrode after firing, or under humidity resistance load test, as water enters inside the element body through a void which exists in the outer layer, degradation of insulating resistance results.

To solve such problems as described above, a method for promoting densification of the outer layer portion appears to be effective. The patent document 1 discloses a technique that after forming the external electrode (terminal electrode) on sintered ceramic body, the entire outer surface is coated with oxide glass to form a glass coat layer, and then the glass coat layer on the outer side of the terminal electrode compared to the electrode coating portion is polished and the surface of the terminal electrode is exposed.

However, this prior art process is a cumbersome and complex, that is, after forming the terminal electrodes in the sintered ceramic body, to form a glass coat layer by coating with oxide glass, and then to polish the glass coat layer on the outer side of the terminal electrode compared to the electrode coating portion, and to make the surface of the terminal electrode exposed. In addition, it is difficult to apply this prior art to small size product.

In patent document 2, a method has been proposed to improve the moisture resistance by filling the oxide compound comprising Mg and Ni as the metal constituting the internal electrode at the boundary portion between the side portion of the internal electrode and the void portion of the side face of the ceramic sintered body.

However, in the case of the above method, it is difficult to improve the moisture resistance while maintaining the dielectric properties due to the diffusion of Mg component into the ceramic element body.

Further, in patent document 3, for the purpose of suppressing the unevenness of sintering between the outer layer portion and the inner layer portion, a manufacturing method of adding the same Ni powder as that covers dielectric body into the ceramic material paste for outer layer portion, is described. However, since Ni has a tendency to diffuse into the dielectric layer during the firing process, there is a problem of the degradation of the electrical properties due to the influence of the diffusion of Ni from the dielectric layers constituting the outer layer portion to the inner layer portion.

In patent document 4, it has been described that the metal portion comprising the same components as the main component of the internal electrode layers exists in an island-like scattered state, in the surrounding portion between the layers where internal electrode layers are provided except the connection end of the internal electrode layers and the external electrodes, whereby the adhesion between the dielectric layers in the surrounding portion where the internal electrode layers are not formed is enhanced, the occurrence of cracks and delaminating can be reduced, and the moisture resistance is improved. However, there is a concern regarding the diffusion of Ni into the inner portion, just as in the case of patent document 3.

The patent document 5 describes a laminated capacitor, that Ni concentration in the dielectric layer of the inner layer portion is controlled to a level lower than that of the outer layer portion, and of the region between the connection ends of the external electrode layers and the internal electrode layers.

The concentration of the Ni diffused into the dielectric in the patent document 5 does not represent the Ni particles segregated in the dielectric layer. Moreover, the Ni is not distributed unevenly as described in the sample of the Experimental Example of patent document 5.

PATENT DOCUMENTS

[Patent Document 1] JP-A-3531543
[Patent Document 2] JP-A-2010-103566
[Patent Document 3] JP-A-4293615
[Patent Document 4] JP-A-2011-29533
[Patent Document 5] JP-A-2000-331867

SUMMARY

In a method for increasing the moisture resistance of the outer layer portion, in which a glass component or an additional element to lower the sintering temperature is added to the dielectric layer of the outer layer portion with a higher concentration than the composition of the dielectric material of the inner layer portion, it is difficult to prevent deterioration of electrical characteristics due to the diffusion of the added components into the inner layer portion.

In view of such actual circumstances, the present invention aims, in embodiments, to provide a laminated ceramic electronic component, wherein in the dielectric layers of the outer layers, the sintering aid does not exist in a high concentration, and the outer layer portion is dense, even though the laminated ceramic electronic component is compact, it has excellent electrical properties and moisture resistance.

Embodiments of the present invention provides a laminated ceramic electronic component comprising an inner layer portion, which comprises a plurality of alternately laminated dielectric layers and internal electrode layers, and a pair of dielectric outer layer portions which sandwich the inner layer portion, wherein the internal electrode layers comprise Ni as main component, and wherein Ni particles are segregated in the dielectric outer layer portions.

It is preferable that when a distance between the internal electrode layers is set as a, Ni particles segregated in the dielectric outer layer portions exist at a distance of a/2 or more apart from the position of the outermost internal electrode layer. In this way, the laminated ceramic electronic component with improved moisture resistance, and improved reliability of high temperature acceleration lifetime can be obtained.

In embodiments, a laminated ceramic electronic component of the present invention comprises an inner layer portion, in which a plurality of dielectric layers and internal electrode layers comprising Ni as main component are laminated alternately; and a pair of dielectric outer layer portions which sandwich the inner layer portion, wherein the amount of Ni particles existing in said dielectric layers is less than the amount of Ni particles existing in dielectric outer layer portion.

Usually, in the inner layer portion and the outer layer portion after sintering, there are voids which are spaces not filled with dielectric particles. If the voids exist in large amounts, under conditions of high humidity, the insulation is degraded due to the entering of moisture into the interior of the ceramic element body.

The inventors of the present invention focused on the Ni element diffused into the dielectric particles in the firing process.

Typically, the dielectric particles (main component particles) and the grain boundary formed between them exist in the inner layer portions and the outer layer portions after firing. Ni contained in the internal electrode layers is diffused into the dielectric layers during firing or during the heat treatment after firing. Because the Ni diffused into the dielectric layer almost does not form a solid solution in the dielectric particles, most of them tend to remain in the grain boundary. Since the Ni remaining in the grain boundary exists in the form of an oxide, the laminated ceramic electronic component will not have short-circuit defect. However, if the Ni remains largely at the grain boundaries, since the grain boundary layers with a dielectric constant lower than that of the dielectric particles become thicker, a degradation of capacitance or a decrease in reliability results.

Embodiments of the present invention are intended to reduce the amount of voids existing in the outer layer portions by precipitating the Ni diffused into the dielectric layers in the form of Ni particles, and to obtain a laminated ceramic electronic component with high moisture resistance.

The present inventors of the invention have found that, after the heat treatment for the purpose of sintering, by conducting heat treatment in a temperature range in which the sintering does not proceed once again, Ni which has diffused as oxides into the grain boundary can be reduced, and can be precipitated as metal Ni particles.

As a result of further intensive studies, by controlling the heat treatment conditions after sintering of the above, it is possible to reduce the amount of the voids while not proceeding the sintering of the dielectric.

By controlling the conditions of the above heat treatment after sintering, the moisture resistance and electrical properties of the laminated ceramic electronic component can be further improved.

According to the heat treatment conditions, the Ni particle may be precipitated with high frequency in the inner layers, or in the vicinity of the outermost internal electrode layers and the outer layers.

If Ni is precipitated largely in the inner layers, there is a tendency that the variation in electric field strength generated in the dielectric layer of the inner layer portions increases, and the reliability deteriorates.

By controlling the heat treatment temperature, holding time, and the atmosphere, in the area where the voids exists largely in interior of the element body, Ni particle can be first precipitated.

The void in the element body indicates the void in the dielectric layers and the space where the electrodes existing in the internal electrode layers are interrupted.

In the heat treatment, a part of Ni diffused into the outer layers in the sintering process move again to the internal electrode layers which is the origin of diffusion, and assuming the distance between the inner electrode layers as a, it is possible to reduce the Ni particles precipitated in the dielectric layers of the inner layer portions by controlling the heat treatment condition to a condition under which the Ni diffused into the dielectric layers can be moved in a distance of a/2 or more.

On the other hand, in the outer layer portions, Ni existing in the position of a/2 or less apart from the outermost internal electrode layer tends to move to the outermost internal electrode layer, and Ni existing in the position of a/2 or more tends to precipitate into the outer layer portions.

Assuming that a distance between the electrode layers inside as a, by satisfying that Ni particles being segregated in the outer layer portions are present in a position of a/2 or more apart from the position of the outermost internal electrode layer, a laminated ceramic electronic component with improved moisture resistance and improved reliability of high temperature acceleration lifetime can be obtained.

By controlling the amount of Ni particles as described above, the laminated ceramic electronic component with high reliability can be obtained. In the firing process, Ni is diffused not only into the outer layer portions, but also into the inner layer portions. If the precipitation frequency of Ni particles precipitated in the inner layer portions is equal to or not less than that in the outer layer portions, high temperature acceleration lifetime deteriorates.

DETAILED DESCRIPTION OF EMBODIMENTS

Figure 1:
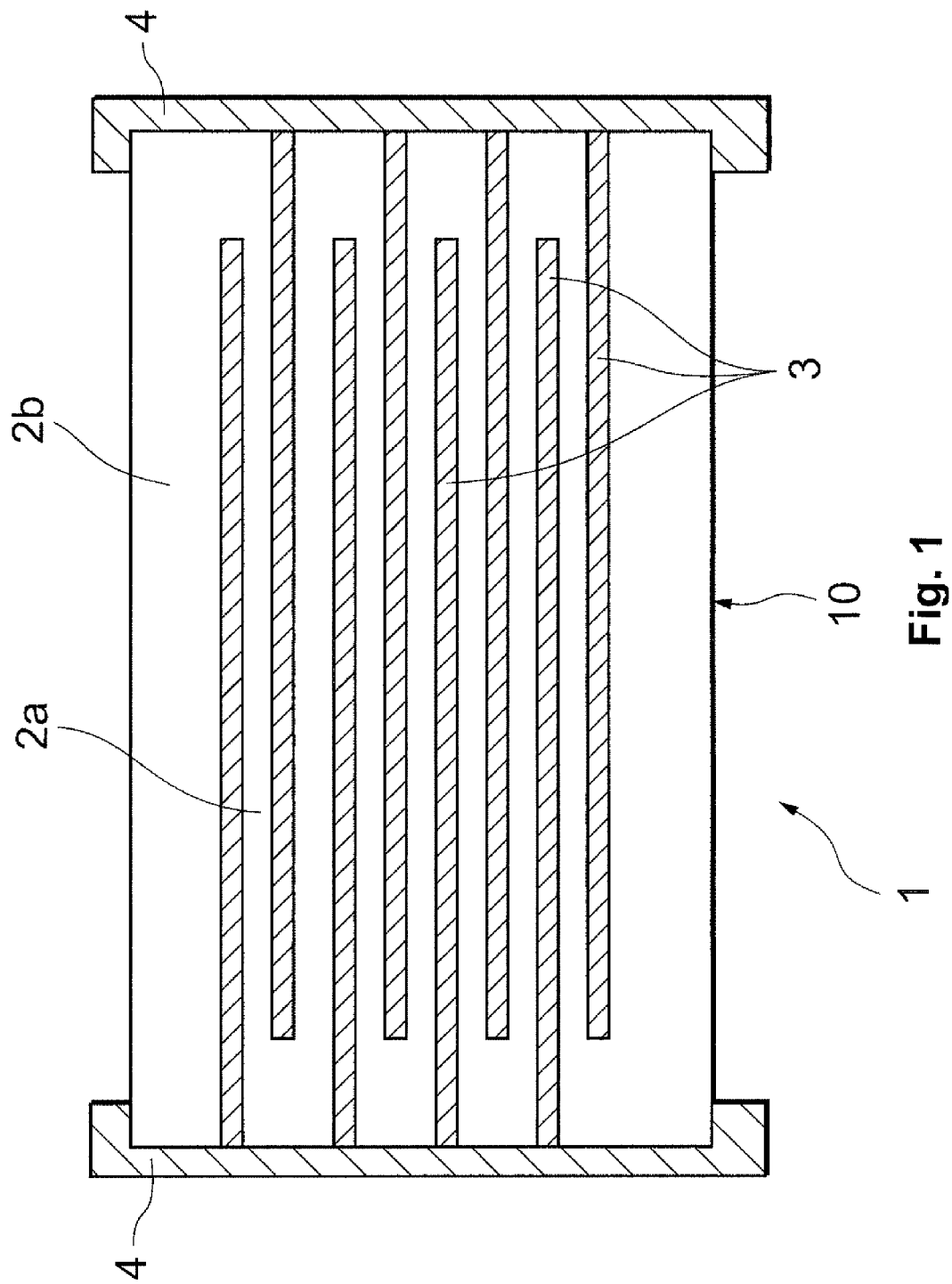
FIG. 1 is a cross-sectional view of a laminated ceramic capacitor according to an embodiment of the present invention.

Hereinafter, the present invention will be described with reference to embodiments shown in the drawings.
<Laminated Ceramic Capacitor 1>

As shown in FIG. 1, a laminated ceramic capacitor 1 according to an embodiment of the present invention includes a capacitor element body 10 which is configured by dielectric layers 2a and internal electrode layers 3 being alternately laminated. There are outer layer portions 2b which sandwich internal electrode layers positioned in the outermost. On both ends of the capacitor element body 10, a pair of external electrodes 4 are formed which respectively conduct with internal electrode layers 3 provided alternately arranged inside the capacitor element body 10. There is no particular restriction on the shape of the capacitor element body 10, the typical being rectangular parallelepiped shape. In addition, its dimension is not particularly limited either, and may be made into a suitable size depending on its application.

<Dielectric Layers 2a>

Dielectric layers 2a are composed of a dielectric ceramic composition according to an embodiment of the present invention. The dielectric ceramic composition is composed of dielectric particles, which is a compound having a perovskite crystal structure and represented by the general formula: $ABO_3$ as a main component. In the general formula of $ABO_3$, A-site atom is preferably at least one selected from the group consisting of Ba, Ca and Sr, and B-site atom is preferably at least one selected from the group consisting of Ti, Zr and Hf. It should be noted that the amount of oxygen (O) may be slightly deviated from the stoichiometric composition of the above formula.

In addition, the molar ratio of the A-site atom and B-site atom is expressed as the A/B ratio, in the present embodiment, the A/B ratio is preferably from 0.98 to 1.02.

In addition, depending upon the desired properties, in the present embodiment, the above-mentioned dielectric ceramic composition may also contain auxiliary component elements. As auxiliary component elements, there is no particular limitation, and Mg and/or at least one selected from rare earth elements is preferred. Further, an oxide containing Si can also be included.

The content of the oxide of Mg, which may be determined according to the desired characteristics, with respect to 100 moles of $ABO_3$, in terms of MgO, is preferably 0.2 to 2.5 moles. There are advantages of obtaining the desired capacitance-temperature characteristics and the IR lifetime by including the oxide.

When R is represented as the rare earth element, the content of the oxide of a rare earth element, which may be determined according to the desired properties, is preferably 0.2 to 2.5 moles, with respect to 100 moles of $ABO_3$, in terms of $R_2O_3$. An advantage of improving the IR lifetime can be obtained by including the oxide. The element of R is at least one selected from the group consisting of Sc, Y, La, Ce, Pr, Nd, Pm, Sm, Eu, Gd, Tb, Dy, Ho, Er, Tm, Yb and Lu, and it is preferred that the element of R is at least one selected from the group consisting of Y, Dy, Gd and Ho.

The content of the oxide containing Si, which may be determined according to the desired characteristics, with respect to 100 moles of $ABO_3$, in terms of $SiO_2$, is preferably 0.2 to 3.0 moles. By including the oxide, mainly the sintering property of the dielectric ceramic composition is improved. In addition, as the oxide containing Si, it can be a composite oxide of Si and other metal elements (for example, alkali metal or alkaline earth metal) and the like, in this embodiment, the composite oxide $(Ba,Ca)SiO_3$ of Si, Ba and Ca is preferred.

In addition, in the present embodiment, depending upon the desired properties, the dielectric ceramic composition described above may contain other auxiliary components.

For example, in the dielectric ceramic composition according to the present embodiment, the oxide of Mn and/or Cr may be included. With respect to 100 moles of $ABO_3$, in terms of each oxide, the content of the oxide is preferably 0.02 to 0.30 moles.

In addition, in the dielectric ceramic composition according to the present embodiment, an oxide of at least one element selected from the group consisting of V, Ta, Nb, Mo and W, may be included. With respect to 100 moles of $ABO_3$, in terms of each oxide, the content of the oxide is preferably 0.02 to 0.30 moles.

The thickness of the dielectric layers 2a is not particularly limited, but may be appropriately determined depending on the desired characteristics or application or the like, and it is preferably 3 µm or less, more preferably 2 µm or less, particularly preferably 1 µm or less. In addition, the number of lamination of the dielectric layers 2a is not particularly limited, and it is preferably 20 or more, more preferably 50 or more, particularly preferably 100 or more.

<Outer Layer Portions 2b>

The outer layer portion 2b is composed of a dielectric ceramic composition according to an embodiment of the present invention. The dielectric ceramic composition is preferably the same as the dielectric ceramic composition contained in the dielectric layers 2a. The thickness of the outer layer portion 2b is not particularly limited, but may be appropriately determined depending on the desired characteristics or application or the like, and it is preferably 40 µm or less, more preferably 30 µm or less, particularly preferably 20 µm or less. With such configuration, the effect of improving moisture resistance is high.

<Ni Particles to Precipitate>

Figure 2:
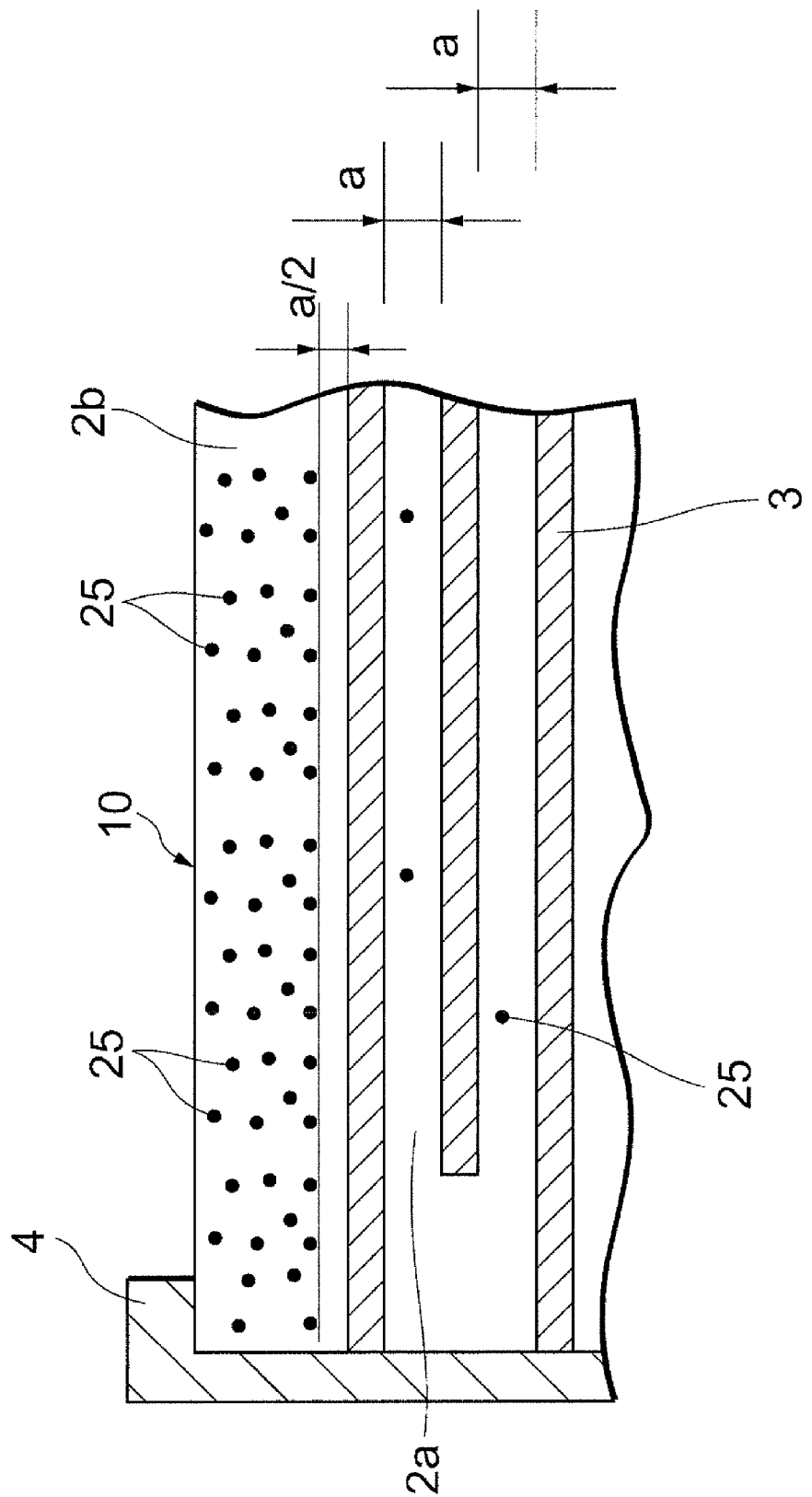
FIG. 2 is an enlarged cross-sectional view of a portion of the dielectric layers and the outer layers shown in FIG. 1.

As shown in FIG. 2, assuming that a distance between the internal electrode layers is a, Ni particles 25 are preferably provided at a distance of a/2 or more away from the position of the outermost internal electrode layer.

Precipitation frequency of Ni particles in the outer layer portion is measured as in the following example.

That is, the value is obtained by cutting the capacitor element body 10 in the laminating direction of the dielectric layers 2a and the internal electrode layers 3, and calculating as the area fraction of the total amount of Ni particles existing in the region of a/2 or more away from the position of the outermost internal electrode layer in the cross section in respect to the measured region.

The precipitation frequency of Ni particles is not particularly limited, but it preferably exists in a frequency of 0.04% or more with respect to the measured region of the outer layer portion. The moisture resistance of the laminated ceramic electronic component becomes good when it exists in a frequency of 0.04% or more. And it is more preferably in a frequency of 0.20% or more, particularly preferably in a frequency of 0.30% or more.

The size of the measured field of view is not particularly limited, but it is preferably 1500 µm$^2$ or more.

The particle diameter of Ni particles 25 is measured in the following manner, for example. That is, the value is obtained by cutting the capacitor element body 10 in the laminating direction of the dielectric layers 2a and the internal electrode layers 3, then measuring the average area of Ni particles in the cross section, and calculating the diameter as a circle equivalent diameter, and multiplying the diameter with 1.27 times.

The particle diameter of Ni particles 25 is not particularly limited, but it is preferably 20 nm or more. And it is more preferably 50 nm or more, particularly preferably 80 nm or more.

<The Dielectric Particles and Structures Between the Particles>

Figure 3:
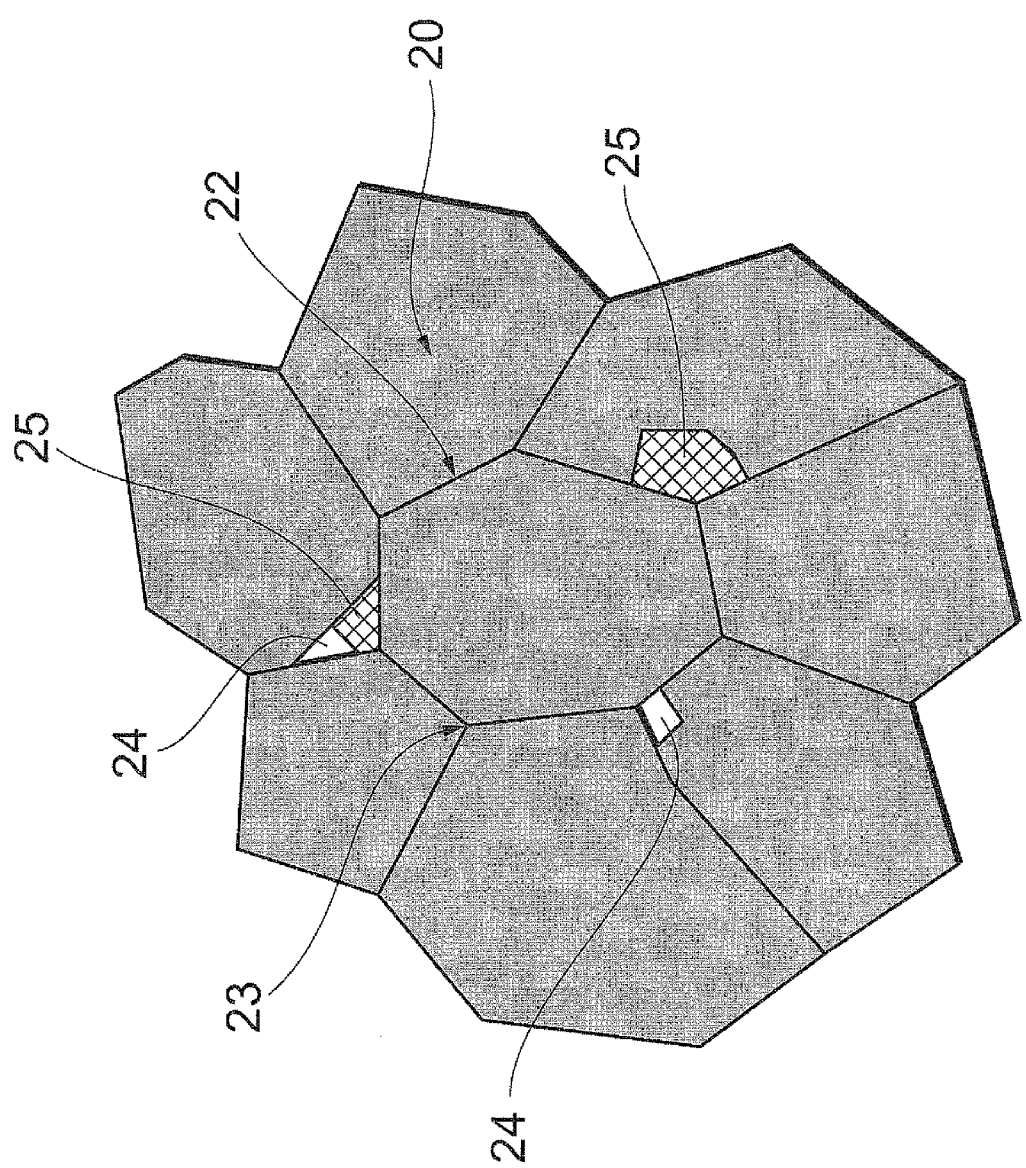
FIG. 3 is an enlarged cross-sectional view of a laminated ceramic capacitor shown in FIG. 1.

As shown in FIG. 3, the dielectric layers 2a and the outer layer portions 2b include dielectric particle 20, void 24, Ni particle 25 and the grain boundary 22 formed between the plurality of dielectric particles 20 adjacent to each other. In this embodiment, the dielectric particle 20 may be a particle formed by solid-solution (diffusion) of the element R or the auxiliary component elements like Mg or Si and the like in the main component particles (particles of $ABO_3$).

Further, the average crystal particle diameter of the dielectric particle 20 of the present embodiment is not particularly limited, but preferably 0.25 µm or less. There is a tendency that as the particle diameter of the dielectric particle becomes smaller, the amount of Ni to be diffused during the firing procedure becomes larger. If the average crystal particle diameter is 0.25 μm or less, the amount of the Ni diffusing into the dielectric increases, and the amount of Ni particles to be precipitated increases.

As a result, the moisture resistance will be further improved.

For example, the crystal particle diameter of the dielectric particle 20 is measured in the following manner. That is, the value is obtained by cutting the capacitor element body 10 in the laminating direction of the outer layer portions 2b, the dielectric layers 2a and the internal electrode layers 3, then measuring the average area of the Ni particles in the cross section, and calculating the diameter as an circle equivalent diameter, and multiplying the diameter with 1.27 times. Then, the crystal particle diameter is measured in respect of dielectric particles of 200 or more, and the value having cumulative frequency of 50% based on a cumulative frequency distribution of the resulted crystal particle diameter, is used as the average crystal particle diameter (unit: μm). In addition, the crystal particle diameter may be determined in accordance with the thickness of the outer layer portions 2b and the dielectric layers 2a.

Although the grain boundary 22 is mainly composed of the oxide of the element contained in the dielectric layers, it may contain the oxide of the element mixed as an impurity during the process or the oxide of the element constituting the internal electrode layers and the like. Further, the grain boundary 22 is usually formed mainly with amorphous material but may also be formed with crystal material.

In the present embodiment, Ni is controlled to be included in the grain boundary 22 in a particular ratio.

Further, the content ratio of Ni in the grain boundary 22, which may be determined according to the desired properties, in terms of NiO, is preferably 0.2 to 1.4 mass %.

The internal electrode layers 3 are composed of a conductive material comprising Ni, during the firing process and the subsequent heat treatment process, etc., Ni is diffused into the outer layers 2b and the dielectric layers 2a. However, in this case, since it is difficult to form a solid solution in the dielectric particle 20, Ni tends to remain in the grain boundary 22. Further, in the case of the oxide of Ni being included as an auxiliary component, Ni also tends to remain in the grain boundary 22.

By controlling the concentration of MO in the grain boundary 22 within the above-described scope, the reliability of the laminated ceramic electronic component (insulation resistance lifetime) can be further improved.

As a method for measuring the content ratio of Ni in the grain boundary 22, there is no particular limitation, for example, it may be measured as follows.

In the present embodiment, by observing the dielectric layers 2a and the outer layers 2b using scanning transmission electron microscope (STEM), the dielectric particle 20 and the grain boundary 22 are determined, and further, the point analysis in the grain boundary 22 is performed using the energy dispersive X-ray spectrometry apparatus (EDS) supplied with the STEM, and the content ratio of each element in the grain boundary 22 is calculated.

In particular, the cross section of the dielectric layers 2a and the outer layer portions 2b is pictured by STEM to obtain a bright field (BF) image. In this bright field image, the region existing between the dielectric particle 20 and the dielectric particle 20 and having a contrast which is different from the dielectric particle is taken as the grain boundary 22. For determining whether or not having different contrast, it may be carried out by visual, or may be determined by software with image processing function or the like.

Subsequently, in the region which is determined to be the grain boundary 22, the point analysis is performed using EDS. At this time, in order that the information of the element contained in the region other than the grain boundary, such as the dielectric particles and the like, is not to be detected, the measurement conditions of the beam diameter, the acceleration voltage, and the aperture CL and the like should be adjusted. In addition, the number of measurement points is not particularly limited, and it is preferably 10 points or more.

When the content ratio of all the elements detected in the measuring points is converted to oxide and set the total of them to 100 mass %, the content ratio of Ni is defined as the mass ratio in terms of NiO. Then, the average value of the content ratio of Ni in each measurement point is calculated, and the value is taken as the content ratio of Ni in the grain boundary.

In the present embodiment, the grain boundary is defined as the boundary region that exists between two particles. Therefore, the content ratio of the elements in region 23 existing between the particles of three or more (the triple point and the like) is not taken into account of the content ratio of the elements in the grain boundary as described above.

<Internal Electrode Layers 3>

Conductive material contained in the internal electrode layers 3 is preferably Ni or Ni alloy. As Ni alloy, the alloy of one or more elements selected from Mn, Cr, Co and Al with Ni is preferred, the Ni content in the alloy is preferably 95 mass % or more. Note that in Ni or Ni alloy, various trace components such as P and the like may be contained in an amount of about 0.1 mass % or less. The thickness of the internal electrode layer 3 may be appropriately determined depending on the application and the like.

If the internal electrode layers 3 are enlarged, generally, in the portions where the internal electrodes should be formed, there are portions where the internal electrodes are not formed (portions of electrode being non-existent) in fact. The portion of electrode being non-existent is a region that is formed in the way that, during firing, the conductive material particles (Ni particles primarily) are spheroidized due to grain growth, thereby the spaces between the adjacent conductive material particles open, and the conductive material no longer exists in the region.

<External Electrode 4>

Conductive material contained in the external electrodes 4 is not particularly limited, and inexpensive Ni, Cu, or alloys thereof can be used in the present invention. The thickness of the external electrode 4 may be appropriately determined depending on the application and the like.

<Manufacturing Method of a Laminated Ceramic Capacitor 1>

The laminated ceramic capacitor 1 of the present embodiment is manufactured similarly to the conventional laminated ceramic capacitor by preparing a green chip by a usual printing method using the paste or a sheet method, and after the green chip has been fired, printing or transferring external electrodes, then firing. Hereinafter, the manufacturing method will be described in detail.

First, a dielectric raw material for forming dielectric layers (the outer layer portions 2a and the dielectric layers 2b is prepared, and it is made into a paint, thereby preparing a paste for the dielectric layers.

As the dielectric raw material, first, a raw material of $ABO_3$, a raw material of oxide of Mg, a raw material of the oxides of rare earth elements, and a raw material of the oxide containing Si are prepared. As these raw materials, the oxides of the components described above, their mixtures, or composite oxides can be used. Further, they can also be selected properly from various compounds to be oxides or composite oxides described above by firing, for example, carbonate, oxalate salt, nitrates, hydroxides, organometallic compounds and the like, and be used in combination.

In addition, the raw material of $ABO_3$ which is prepared by a variety of methods of the so-called solid phase method, and various liquid phase methods (for example, the oxalate method, the hydrothermal synthesis method, the alkoxide method and the sol-gel method and the like), can be used.

In addition, in the case that the components other than the main components and auxiliary components described above are contained in the dielectric layers, as a raw material for these components, in the same manner as described above, the oxides of these components, their mixtures, or composite oxides can be used. Further, various compound oxides or composite oxides described above by firing can also be used.

The content of each compound in the dielectric raw material may be determined in the way that the composition of the dielectric ceramic composition after firing as described above is obtained. In the state before painting, the particle diameter of the dielectric raw material is typically an average particle diameter of about 0.08~1 μm.

The paste for dielectric layers may be an organic based paint obtained by mixing the dielectric raw material with organic vehicle, and it also may be water based paint.

The organic vehicle is obtained by dissolving a binder in an organic solvent. The binder is not particularly limited and may be suitably selected from a variety of normal binders of ethyl cellulose, and polyvinyl butyral and the like. The organic solvent is not particularly limited either, and depending on the printing method or sheet method or the like, it may be appropriately selected from various organic solvents of terpineol, butyl carbitol, acetone, and toluene and the like.

Further, when the paste for dielectric layers is made as the water based paint, it may be obtained by mixing a water based vehicle with the dielectric raw material, wherein the water based vehicle is obtained by dissolving a water-soluble binder or a dispersant and the like in water. The water-soluble binder is not particularly limited, for example, polyvinyl alcohol, cellulose, and water-soluble acrylic resin and the like may be used.

The paste for internal electrode layers may be prepared by mixing the conductive material, various oxides, organometallic compounds, or resinate and the like with the organic vehicle described above, wherein the conductive material is composed of Ni or Ni alloy described above, and the various oxides is derived from Ni or Ni alloy described above after firing. In addition, the paste for internal electrode layers may contain cooperative materials. As cooperative materials, there is no particular limitation, but it is preferable to have a composition similar to the main component of the dielectric layers.

The paste for external electrodes may be prepared in the same manner as the paste for internal electrode layers described above.

The content of the organic vehicle in each paste described above is not particularly limited, the normal content may be, for example, about 1-5 mass % for the binder, about 10-50 mass % for the solvent. Further, in each paste, additives selected form various dispersants, plasticizers, dielectrics, insulators, etc., may also be included if necessary. The total content of these is preferably 10 mass % or less.

When using the printing method, after the paste for dielectric layers and the paste for internal electrode layers are printed and laminated onto a substrate such as PET, and cut into a predetermined shape, the green chip is made as it is peeled off from the substrate.

In addition, when using the sheet method, after a green sheet is formed by using the paste for dielectric layers, and the paste for internal electrode layers is printed thereon, a green chip is made as they are laminated and cut into a predetermined shape.

Before firing, the binder removal treatment from the green chip is performed. As the conditions for the binder removal, the heating rate is preferably 5~300° C./hour, and the holding temperature is preferably 180~400° C., and the temperature holding time is preferably 0.5 to 24 hours. In addition, the atmosphere in the binder removal process is air or a reducing atmosphere.

After binder removal, the firing of green chips is performed. During the firing process, heating rate is preferably 200'C/hour or more. The holding temperature is preferably 1100~1300° C., and the holding time is preferably 0.1~4 hours.

The atmosphere during firing is preferably a reducing atmosphere, as an atmosphere gas, for example, the gas mixture of $H_2$ and $N_2$ humidified can be used.

In addition, the oxygen partial pressure during firing is preferably $1.0 \times 10^{-6}$~$1.0 \times 10^{-2}$ Pa. The cooling rate is preferably 50° C./hour or more.

In the present embodiment, for the element body after firing, the annealing process is composed of the first annealing process and the second annealing process. The holding temperature during the first annealing process is preferably 800~1000° C., and the holding time is preferably 2~200 hours. The heating rate is preferably 200° C./hour or more, and the cooling rate is 50° C./hour or more.

In addition, the atmosphere of the first annealing process is preferable a reducing atmosphere, and as an atmosphere gas, for example, the gas mixture of $H_2$ and $N_2$ can be humidified and used. An oxygen partial pressure is preferably $10^{-8}$~$10^{-14}$ Pa.

Of the second annealing process, holding temperature is preferably 650~1000° C., holding time is preferably 0.1 to 4 hours. In addition, the atmosphere during the oxidation treatment is preferably humidified $N_2$ gas (oxygen partial pressure $1.0 \times 10^{-3}$~1.0 Pa).

In the above-mentioned binder removal treatment, firing and annealing (first annealing and second annealing) treatment, in the case of $N_2$ gas or mixed gas, etc. being humidified, for example wetter and the like may be used. In this case, the water temperature is preferably 5~75° C.

The binder removal treatment, firing and annealing (first annealing and second annealing) treatment may be carried out continuously, and also may be performed independently.

By controlling the firing conditions and the annealing conditions as described above, the content ratio of Ni element at the grain boundaries and the number of Ni precipitated in the outer layers can be of a desired value. As a result, it is possible to obtain a laminated type ceramic electronic component indicating good dielectric properties.

For the capacitor element body obtained as above, the polishing of end face is performed by barrel polishing or sand blasting or the like, for example, and the paste for external electrodes is coated, then fired, whereby the external electrodes 4 are formed. Then, if necessary, at the surface of the external electrodes 4, the coating layers are formed by plating or the like.

The laminated ceramic capacitor of the present embodiment manufactured in this manner can be mounted on a printed circuit board by soldering and the like, and used in various types of electronic equipment and the like.

Embodiments of the present invention have been described above. However, it should be noted that the present invention is in no way limited to the details of the described embodiments, as changes and modifications may be made without departing from the scope of the present invention.

In the embodiments described above, a laminated ceramic capacitor as a laminated type ceramic electronic component according to the present invention has been illustrated, but the laminated type ceramic electronic component according to the present invention is not limited to a laminated ceramic capacitor, as it can be any electronic components having the above configuration.

EXAMPLES

The present invention will be explained below in more detail based on examples, but the present invention is not limited to these examples.

Experimental Example 1

Sample No. a-1~5

First, $BaTiO_3$ powder was prepared as the raw material of $ABO_3$ as the main component. Further, $MgCO_3$ powder as a raw material of oxide of Mg, $R_2O_3$ powder as a raw material of oxide of element R, $(Ba_{0.6}Ca_{0.4})SiO_3$ (hereinafter also referred as BCG) powder as a raw material of oxide containing Si, MnO powder as the raw material of oxide of Mn, and $V_2O_5$ powder as a raw material of the oxide of V, were prepared respectively as raw materials of auxiliary components. In addition, $MgCO_3$ was contained in the dielectric ceramic composition in the form of MgO after firing.

Then, $BaTiO_3$ powder prepared above (mean particle size 0.20 μm) and the materials of auxiliary components were wet-milled for 15 hours in a ball mill, and dried, thereby a dielectric raw material was obtained. In addition, in the dielectric ceramic composition after firing, the amount of each auxiliary component added in terms of the respective oxides, with respect to 100 moles of $BaTiO_3$ as the main component, was as follows: MgO 1.5 mol, $Y_2O_3$ 0.4 mol, $Dy_2O_3$ 0.4 mol, BCG 0.9 mol, MnO 0.1 mol, $V_2O_5$ 0.1 mol.

Then, 100 parts by mass of the obtained dielectric material, 10 parts by mass of polyvinyl butyral resin, 5 parts by mass of dioctyl phthalate (DOP) as a plasticizer, and 100 parts by mass of alcohol as a solvent were mixed in a ball mill to make a paste, and thus a paste for dielectric layers was obtained.

In addition, apart from the above, 44.6 parts by mass of Ni powder, 52 parts by mass of terpineol, 3 parts by mass of ethyl cellulose, and 0.4 parts by mass of benzotriazole were kneaded by three rolls, and then made into a slurry, and the paste for the internal electrode layers was made.

Then, by using the paste for dielectric layers prepared above, a green sheet was formed on a PET film. Then, after printing electrode layers in a predetermined pattern thereon by using the paste for internal electrode layers, the sheet was peeled off from the PET film, and a green sheet having the electrode layers was prepared. Then, by laminating a plurality of green sheets having the electrode layers and adding pressure on them to make them bonded, a green laminate was prepared, and by cutting the green laminate in predetermined size, green chips were obtained.

Next, as to the green chips thus obtained, binder removing treatment, firing treatment, first annealing treatment and second annealing treatment were performed under the following conditions, and a capacitor element body in the form of a sintered body was obtained.

The condition of binder removing treatment was set as, heating rate: 15° C./hour, holding temperature: 280° C., temperature holding time: 8 hours, atmosphere: in the air.

The condition of firing was set as, heating time: 200° C./hour, holding temperature: 1200° C., holding time: 2 hours, cooling rate: 200° C./hour, atmosphere gas: humidified $N_2+H_2$ mixed gas (with an oxygen partial pressure of $1.0 \times 10^{-4}$ Pa).

Conditions of the first annealing were set as, heating time: 200° C./hour, holding time: 50 hours, cooling rate: 200° C./hour, and the oxygen partial pressure of atmosphere gas and holding temperature being shown as in Table 1.

Conditions of the second annealing was set as, heating time: 200° C./hour, holding time: 2 hours, cooling rate: 200° C./hour, and the oxygen partial pressure of atmosphere gas and holding temperature being shown as in Table 1.

TABLE 1

| Annealing condition No. | First annealing conditions | | Second annealing conditions | |
|---|---|---|---|---|
| | Annealing temperature (° C.) | Oxygen partial pressure (Pa) | Annealing temperature (° C.) | Oxygen partial pressure (Pa) |
| 1 | — | — | 900 | $1.0 \times 10^{-2}$ |
| 2 | 1100 | $1.0 \times 10^{-8}$ | 900 | $1.0 \times 10^{-2}$ |
| 3 | 1000 | $1.0 \times 10^{-9}$ | 900 | $1.0 \times 10^{-2}$ |
| 4 | 900 | $1.0 \times 10^{-12}$ | 900 | $1.0 \times 10^{-2}$ |
| 5 | 800 | $1.0 \times 10^{-14}$ | 900 | $1.0 \times 10^{-2}$ |
| 6 | 770 | $1.0 \times 10^{-15}$ | 900 | $1.0 \times 10^{-2}$ |
| 7 | 740 | $1.0 \times 10^{-16}$ | 900 | $1.0 \times 10^{-2}$ |

The atmosphere gas was controlled by humidified $N_2+H_2$ gas.

For the humidification of the atmosphere gas during the firing and the first and second annealing step, a wetter was used.

Then, after the end faces of the obtained element body were polished by sandblasting, Cu was coated as the external electrode, and a sample of the laminated ceramic capacitor shown in FIG. 1 was obtained. The size of the obtained capacitor sample was 1.0 mm×0.5 mm×0.5 mm, the thickness of the dielectric layer 2a was 0.8 μm, the thickness of the internal electrode layer 3 was 0.7 μm. The number of the dielectric layers sandwiched by the internal electrode layers was 300. In this experimental example, the thickness of the dielectric layer 2a was taken as the distance a between the internal electrode layers.

For the obtained capacitor samples, the amount of Ni precipitated in the outer layer portions, the humidity resistance load test and high temperature acceleration lifetime (HALT) were carried out by the following methods shown below, respectively.

<Amount of Ni Precipitated in the Outer Layer Portions>

In the region of the cut section from the position of the outermost internal electrode layer to the outermost portion of the outer layers, observation by STEM on Ni particles segregated in the outer layer portions of the dielectric, was performed with 5000 times magnification in five fields of view. The dielectric particles and Ni particles were determined by using an EDS device.

Then, the area fraction of Ni particles in respect to cross-sectional area of the object to be measured was determined. The results are shown in Table 2.

It was confirmed that in the distribution of Ni particle diameter, most of the Ni particle diameters was in the range of 80~100 nm, and Ni particles with the diameter being 40 nm or less, and those with the diameter being 200 nm or more, were less than 5% with respect to the number of total Ni particles.

Then, the position of the Ni particles with respect to the cross-sectional area of the object to be measured was determined. The distance from the position of the outermost internal electrode layer to the Ni particles presented in the closest position was measured. The results are shown in Table 2.

<Humidity Resistance Load Test>

100 pieces of the capacitor samples were placed under 120° C. and in an atmosphere of 95% relative humidity, and an electric field of 5V/μm was applied. After 20 hours, the sample which had the insulation resistance value dropping one order of magnitude or more from the start of the test was considered as faulty sample, and the number of faulty samples were investigated. It should be noted that, in this test, it was regarded as good if the number of faulty samples was five or less. The results are shown in Table 2.

<The High Temperature Acceleration Lifetime (HALT) Test>

For the capacitor samples, the high temperature acceleration lifetime was evaluated by measuring the insulation resistance over the time while applying a DC voltage of 6V at 180° C. In this example, the mean time to failure was calculated by taking the time from the start of application to the time the insulation resistance drops by one order of magnitude as the breakdown time, and carrying out the Weibull analysis thereto. In this example, the evaluation was performed for 20 capacitor samples, and the average value of the mean time to failure was taken as lifetime (MTTF). In this example, it was regarded as good if the lifetime (MTTF) was 20 hours or more, and it was considered very good if the lifetime was 30 hours or more. The results are shown in Table 2.

pared $BaTiO_3$ powder was 0.50 μm, and the thickness of the dielectric layer was 2.5 μm, and the thickness of the internal electrode layer was 0.7 μm, and the number of the dielectric layers sandwiched by the internal electrode layers was 130. The sample of the laminated ceramic capacitor was obtained in the same manner as in sample No. a-1~5, except that the heat treatment conditions for the green chips were as follows: the first firing conditions was set as, heating rate: 200° C./hour, holding temperature: 1250° C., holding time: 2 hours, cooling rate: 200° C./hour, atmosphere gas: humidified $N_2+H_2$ mixed gas (with a partial pressure of oxygen of $1.0 \times 10^{-5}$ Pa).

Sample No. c-1~5

Green chips were obtained in the same manner as in sample No. a-1-5, except that the average particle diameter of prepared $BaTiO_3$ powder was 0.15 μm, and the thickness of the dielectric layer was 0.65 μm, and the thickness of the internal electrode layer was 0.7 μm. The sample of the laminated ceramic capacitor was obtained in the same manner as in sample No. a-1~5, except that the first firing condition was set as, heating rate: 200° C./hour, holding temperature: 1150° C., holding time: 2 hours, cooling rate: 200° C./hour, atmosphere gas: humidified $N_2+H_2$ mixed gas (with a partial pressure of oxygen of $1.0 \times 10^{-5}$ Pa).

As for the obtained capacitor samples, the number per unit area of the amount of Ni precipitated in the outer layer portions and the humidity resistance load test were carried out in the same manner as in Experimental Example 1. The results are shown in Table 3.

The tests on the average crystal particle diameter of the dielectric particles in the outer layer portions, the Ni content

TABLE 2

| Sample No. | Annealing condition No. | Distance a between the internal electrode layers (μm) | Amount of Ni in the outer layer portions Area fraction of Ni particles (%) | Distance from the outermost internal electrode to the position Ni particles exist (μm) | Humidity resistance load test Failure number | High temperature acceleration lifetime (MTTF) (h) |
|---|---|---|---|---|---|---|
| a-1 | 1 | 0.8 | 0 | — | 10 | 14 |
| a-2 | 2 | 0.8 | 0.22 | 1.5 | 2 | 31 |
| a-3 | 3 | 0.8 | 0.28 | 0.8 | 0 | 35 |
| a-4 | 4 | 0.8 | 0.14 | 0.4 | 1 | 46 |
| a-5 | 5 | 0.8 | 0.04 | 0.3 | 4 | 25 |

As shown in sample No. a-1, in the case of the first annealing treatment being not performed, the presence of Ni could not be confirmed in the triple point of the outer layer portions, and the moisture resistance was confirmed to be insufficient. On the other hand, in the case of sample No. a-2~5, the presence of Ni could be confirmed in the triple point of the outer layer portions, and the moisture resistance was confirmed to be good.

In addition, high temperature acceleration lifetime was confirmed to be improved for samples No. a-2, a-3, and a-4, which satisfied the condition that the distances from the outermost internal electrode to the position where Ni particles were present was not less than a/2 apart from the position of the outmost internal electrode layer.

Experimental Example 2

Sample No. b-1~5

Green chips were obtained in the same manner as in sample No. a-1~5, except that the average particle diameter of prein the grain boundary of the outer layer portions, and high temperature acceleration lifetime (HALT) were carried out by the following methods shown below, respectively.

<Average Crystal Particle Diameter of the Dielectric Particles in the Dielectric Layers>

First, the capacitor samples were cut in a plane perpendicular to the dielectric layers. For the cutting plane, STEM observation was performed to determine the dielectric particles. The average area of the particles was measured and the diameter was calculated as the circle equivalent diameter, and the value obtained by multiplying the diameter by 1.27 times was used as the particle diameter. The particle diameter was measured for 200 or more dielectric particles, and from the cumulative frequency distribution of the crystal particles obtained, the cumulative 50% value was used as the average crystal particle diameter (unit: μm). The results are shown in Table 3.

<Proportion of Ni at the Grain Boundaries>

STEM observation was carried out with respect to the cutting plane in the outer layer portion, and the determination of the dielectric particles and grain boundaries was carried out.

Then, using the EDS equipment attached with STEM, point analysis was performed.

As to five particles out of the particles present in the cross-section of the object to be measured, the concentration of Ni at the points of 4 particles at the grain boundary was measured to determine the proportion of the amount of Ni at the measurement points of 5×4. The results are shown in Table 3.

<High Temperature Acceleration Lifetime (HALT) Test>

[Sample No. a-1~5] and [Sample No. c-1~5] were performed under the same conditions as in the Experimental Example 1. [Sample No. b-1-5] was performed in the same manner as in Experimental Example 1 except that the applied voltage was set as 50V. The results are shown in Table 3.

the annealing conditions shown in Table 1, were obtained in the same manner as in Experimental Example 1. For sample No. a-1~7, it was conducted in the same manner as in Experiment 1 to measure the area fraction of Ni precipitated in the outer layer portions, moisture resistance load test, and high temperature acceleration lifetime (HALT) test. The results are shown in Table 4.

Measurement of the amount of Ni precipitated in the dielectric layer portions was carried out by the method shown below.

<Amount of Ni Precipitated in the Dielectric Layers Part>

For the inner layer portion region, observation by STEM was performed in 10 fields of view at 5000 magnification.

TABLE 3

| Sample No. | Annealing condition No. | Diameter of dielectric particle (μm) | Distance a between internal electrode layers (μm) | Amount of Ni in the outer layer portions | | Distance from the outermost internal electrode to the position Ni particles exist (μm) | Humidity resistance load test Number of Failure | High temperature acceleration lifetime (MTTF) (h) |
|---|---|---|---|---|---|---|---|---|
| | | | | Concentration of Ni at grain boundary (wt %) | Area fraction of Ni particles (%) | | | |
| a-1 | 1 | 0.25 | 0.8 | 1.1 | 0 | — | 10 | 14 |
| a-2 | 2 | 0.25 | 0.8 | 0.1 | 0.22 | 1.5 | 2 | 31 |
| a-3 | 3 | 0.25 | 0.8 | 0.3 | 0.28 | 0.8 | 0 | 35 |
| a-4 | 4 | 0.25 | 0.8 | 0.3 | 0.14 | 0.4 | 1 | 46 |
| a-5 | 5 | 0.25 | 0.8 | 0.6 | 0.04 | 0.3 | 4 | 25 |
| b-1 | 1 | 0.6 | 2.5 | 0.3 | 0 | — | 12 | 17 |
| b-2 | 2 | 0.6 | 2.5 | 0.2 | 0.12 | 2 | 2 | 30 |
| b-3 | 3 | 0.6 | 2.5 | 0.2 | 0.1 | 1.4 | 1 | 33 |
| b-4 | 4 | 0.6 | 2.5 | 0.2 | 0.08 | 1.1 | 4 | 23 |
| b-5 | 5 | 0.6 | 2.5 | 0.3 | 0.03 | 0.6 | 5 | 20 |
| c-1 | 1 | 0.17 | 0.65 | 1.2 | 0 | — | 10 | 13 |
| c-2 | 2 | 0.17 | 0.65 | 0.1 | 0.32 | 1.6 | 0 | 38 |
| c-3 | 3 | 0.17 | 0.65 | 0.3 | 0.3 | 0.8 | 0 | 50 |
| c-4 | 4 | 0.17 | 0.65 | 0.6 | 0.32 | 0.5 | 0 | 55 |
| c-5 | 5 | 0.17 | 0.65 | 0.9 | 0.28 | 0.3 | 2 | 27 |

As shown in Table 3, the effect of improving moisture resistance by the Ni precipitated was unrelated to the average crystal particle diameter of the dielectric particles. Except the case of the first annealing being not performed, the presence of Ni particles in the outer layers could be confirmed, and the moisture resistance could be confirmed to be good.

In addition, high temperature acceleration lifetime was confirmed to be excellent for samples No. a-2~4, samples No. b-2~3, and samples No. c-2~4, which satisfied the condition that, with respect to the thickness of the dielectric a, the distance from the outermost internal electrode to the position Ni particles existed was not less than a/2 apart from the position of the internal electrode layers. Regardless of the distance between internal electrode layers a, excellent reliability can be obtained by satisfying the condition that the distance from the outermost internal electrode to the position of the Ni particles present was not less than a/2 apart from the position of the internal electrode layers.

Furthermore, there was observed a tendency that as the average crystal particle diameter of dielectric particles became smaller, moisture resistance improved.

It was made clear that if the average crystal particle diameter of the dielectric particles was small, there would be enough Ni diffusing into the grain boundaries, therefore the frequency of precipitation of the Ni particles would be high.

Experimental Example 3

Sample No. a-1~7

In the same manner as in sample Nos. a-1~5 of Example 1, sample No. a-6, and sample No. a-7 herein, corresponding to Using an EDS device, the identification of the dielectric particles and Ni particles was performed.

Then, the area fraction of Ni particles to the dielectric region of the cross section was measured.

The results are shown in Table 4.

TABLE 4

| Sample No. | Annealing condition No. | Amount of Ni in the outer layer portions Area fraction of Ni particles (%) | Amount of Ni in the dielectric layer portions Area fraction of Ni particles (%) | Humidity resistance load test Number of Failure | High temperature acceleration lifetime (MTTF) (h) |
|---|---|---|---|---|---|
| a-1 | 1 | 0 | 0 | 10 | 14 |
| a-2 | 2 | 0.22 | 0 | 2 | 31 |
| a-3 | 3 | 0.28 | 0 | 0 | 35 |
| a-4 | 4 | 0.14 | 0.01 | 1 | 46 |
| a-5 | 5 | 0.04 | 0.04 | 4 | 25 |
| a-6 | 6 | 0.03 | 0.07 | 8 | 9 |
| a-7 | 7 | 0.01 | 0.04 | 10 | 12 |

As shown in Table 4, sample Nos. a-6 and a-7, if the amount of Ni present in the dielectric layer portions (the dielectric layers 2a) was more than the amount of Ni present in the outer layer portions, the high temperature acceleration lifetime deteriorated.

On the other hand, as shown in sample Nos. a-2-5, if the amount of Ni present in the dielectric layer portions was less than the amount of Ni present in the outer layer portions, the high temperature acceleration lifetime could be confirmed to be improved.

According to embodiments of the present invention, a laminated ceramic electronic component, which is excellent in moisture resistance is provided by precipitating Ni particles in the outer layer portions.

DESCRIPTION OF REFERENCE NUMERALS

1 . . . Laminated ceramic capacitor
10 . . . Capacitor element body
2a . . . Dielectric layers
2b . . . Outer layer portions
20 . . . Dielectric particle
22 . . . Grain boundary
23 . . . Triple point
24 . . . Gap
25 . . . Ni particles
3 . . . Internal electrode layers
4 . . . External electrode

What is claimed is:

1. A laminated ceramic electronic component, comprising an inner layer portion that comprises a plurality of alternately laminated dielectric layers and internal electrode layers, and a pair of dielectric outer layer portions which sandwich the inner layer portion,
wherein the internal electrode layers comprise Ni as a main component, and wherein Ni particles are segregated in the dielectric outer layer portions, and
wherein when a distance between the internal electrode layers is a, the Ni particles segregated in the dielectric outer layer portions are located at a distance of a/2 or more apart from the position of the outermost internal electrode layer.

* * * * *